(12) United States Patent
Magrane

(10) Patent No.: US 10,953,500 B2
(45) Date of Patent: Mar. 23, 2021

(54) METHOD OF MANUFACTURING A TUBULAR MEMBER

(71) Applicant: Impcross Ltd, Glos (GB)

(72) Inventor: Terry Magrane, Glos (GB)

(73) Assignee: IMPCROSS LTD, Glos (GB)

( * ) Notice: Subject to any disclaimer, the term of this patent is extended or adjusted under 35 U.S.C. 154(b) by 77 days.

(21) Appl. No.: 16/324,059

(22) PCT Filed: Aug. 8, 2017

(86) PCT No.: PCT/GB2017/000119
§ 371 (c)(1),
(2) Date: Feb. 7, 2019

(87) PCT Pub. No.: WO2018/029436
PCT Pub. Date: Feb. 15, 2018

(65) Prior Publication Data
US 2019/0176274 A1    Jun. 13, 2019

(30) Foreign Application Priority Data

Aug. 10, 2016    (GB) ...................... 1613780

(51) Int. Cl.
*B23P 15/00*    (2006.01)
*B23P 13/02*    (2006.01)
(Continued)

(52) U.S. Cl.
CPC ............. *B23P 15/00* (2013.01); *B23P 13/02* (2013.01); *F16J 10/02* (2013.01); *G01B 5/06* (2013.01);
(Continued)

(58) Field of Classification Search
CPC ....... B23P 15/00; B23P 13/02; B23P 2700/01; G01B 5/06; G01B 5/12; F16J 10/02;
(Continued)

(56) References Cited

U.S. PATENT DOCUMENTS

| | | | |
|---|---|---|---|
| 3,866,447 A | 2/1975 | Ritchie | |
| 4,768,369 A * | 9/1988 | Johnson | B21C 37/28 29/558 |

(Continued)

FOREIGN PATENT DOCUMENTS

| | | |
|---|---|---|
| CN | 104400334 A | 10/2014 |
| DE | 9307412 U1 | 7/1993 |

(Continued)

OTHER PUBLICATIONS

EPO, International Search Report and Written Opinion in PCT/GB2017/000119, dated Nov. 7, 2017 (dated Jul. 11, 2007).

(Continued)

*Primary Examiner* — John C Hong
(74) *Attorney, Agent, or Firm* — Keusey & Associates, P.C.

(57) ABSTRACT

A method of manufacturing a tubular component including rough machining the exterior surface of a solid billet 1 to reduce the size thereof and form two flanges. An axial blind bore 6 is then machined in the billet 1, after which a probing operation is carried out on the interior surface of the bore 6 in order to check the concentricity. A straightening operation is then performed on the billet in order to reverse any curvature along the longitudinal axis. A further machining operation is then performed on the outside to reduce the wall thickness of the bore before measuring the wall thickness of the bore 6 around the circumference of the billet 1 at least at two different axial positions. The billet 1 is then checked again and a final machining operation is then performed in order to form any ports and upstands which are required.

20 Claims, 4 Drawing Sheets

(51) Int. Cl.
*G01B 5/12* (2006.01)
*G01B 5/06* (2006.01)
*F16J 10/02* (2006.01)
*F15B 15/14* (2006.01)

(52) U.S. Cl.
CPC ............ *G01B 5/12* (2013.01); *B23P 2700/01* (2013.01); *F15B 15/1428* (2013.01)

(58) Field of Classification Search
CPC ..... F15B 15/1428; B21C 37/065; B23B 5/08; B23B 2215/04; B23B 2215/72
See application file for complete search history.

(56) References Cited

U.S. PATENT DOCUMENTS

| | | | |
|---|---|---|---|
| 5,737,957 A | | 4/1998 | Gray |
| 6,145,185 A | * | 11/2000 | Hwang ..................... B21J 5/12 148/233 |
| 6,594,900 B1 | | 7/2003 | Wei |
| 2003/0024385 A1 | | 2/2003 | Vennemeyer et al. |

FOREIGN PATENT DOCUMENTS

| | | |
|---|---|---|
| EP | 2952751 A1 | 12/2015 |
| FR | 2128136 A1 | 10/1972 |

OTHER PUBLICATIONS

GB Intellectual Property Office, Search Report in GB 1,613,780.4, dated Jan. 17, 2017 (dated Jan. 17, 2017).

* cited by examiner

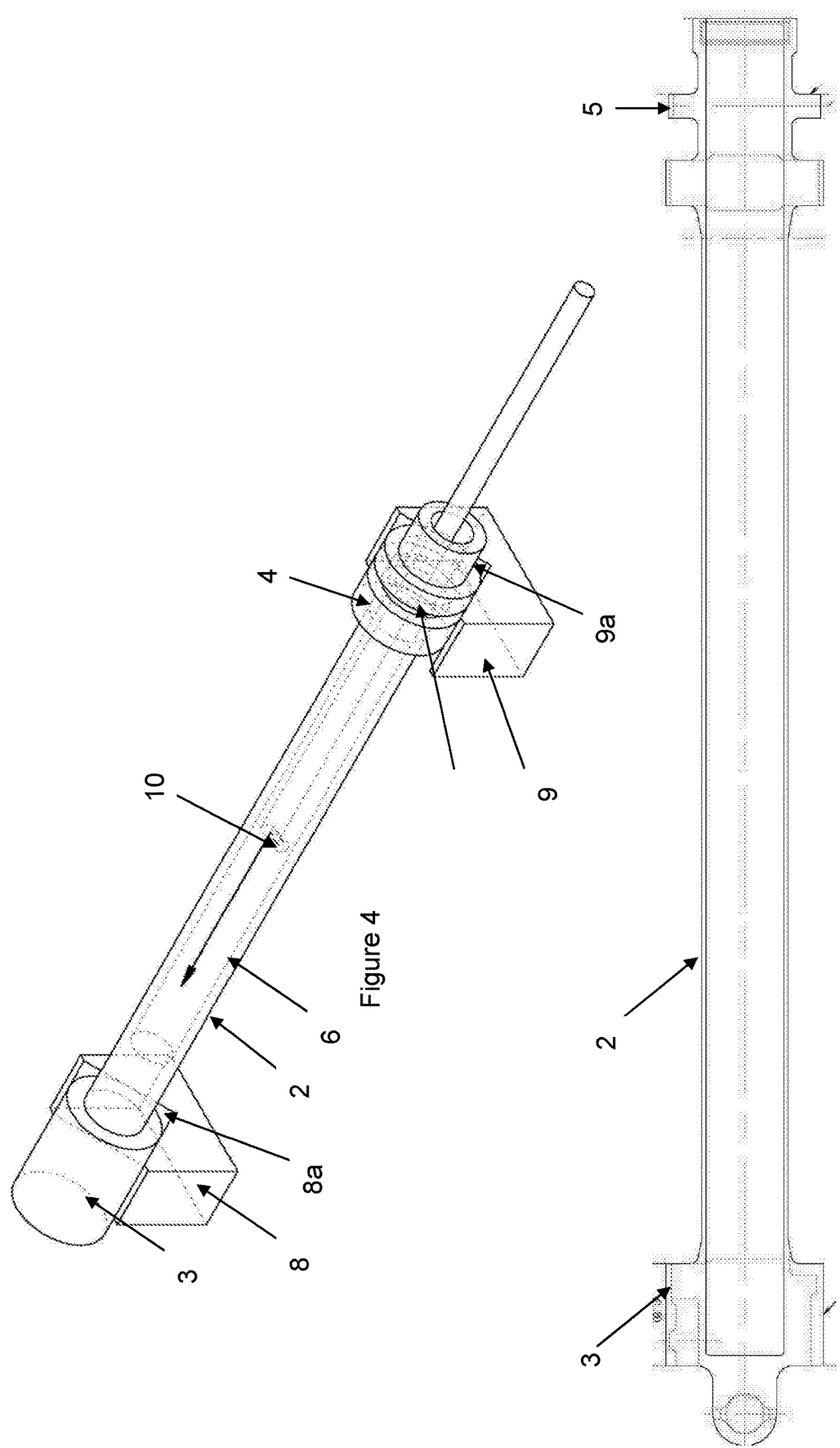

METHOD OF MANUFACTURING A TUBULAR MEMBER

BACKGROUND OF THE INVENTION

1. Field of the Invention

The present invention relates to improvements in relation to the manufacture of tubular members and more particularly to tubular members for use in hydraulic systems in aerospace applications.

2. The Prior Art

Tubular members are commonly used in hydraulic systems in the aerospace industry for delivering high pressure fluid for applications such as deploying flaps on aircraft and the like. The tubular member will be closed off at one end so as to form a blind bore along which a piston can travel so as to compress hydraulic fluid contained within bore. Lateral and radial ports are formed in the side walls of tubular member, typically formed in radially or laterally extending fins or the like, via which the pressurised hydraulic fluid can be delivered to a target component such as a flap actuator. Conventionally, these type of components would be manufactured by forming a through bore in the material, carrying out the machining operations to produce the necessary elements on the exterior surface of the work piece and the required radial ports, for example using a mandrel to support the work piece during the machining operations, and then affixing a cap on one end of the work piece to close the bore. A final honing of the bore typically then being carried out. Such manufacturing processes have historically been generally successful in producing components which meet operational requirements.

However, modern aircraft design has significantly increased the operational demands of these type of components. In particular, the pressure capacity has double for some new aircraft compared with older designs. At the same time, the drive to reduce weight in aircraft in order to reduce operating costs has led to a desire to reduce the weight of these type of components by reducing the amount of material used by reducing the wall thickness and also by using more exotic materials which have a lower density. The increased pressure capacity has made the conventional two part construction less acceptable as the attachment of a separate end cap is a point of possible failure. Further, the materials which are needed to be used in order to achieve the requirement pressure capacity at the reduced weight/wall thickness has a tendency to deform during the manufacturing process.

Hitherto, therefore, it has not been possible to manufacture a tubular hydraulic actuator of the type described above from a single piece of material which meets the operational requirements of the modern aircraft design.

SUMMARY OF THE INVENTION

According to the present invention there is provided a method of manufacturing a tubular component comprising the steps of: (a) rough machining the exterior surface of a solid billet of material to reduce the size thereof and form at least a first radially extending flange and a second radially extending flange on the exterior of the billet, said flanges being centred on and axially spaced along the longitudinal axis of the billet; (b) machining a bore which extending axially in the billet; (c) performing a first robing operation on the interior surface of the bore in order to check the concentricity of the interior surface about a flange axis which extends longitudinally between the centres of the first and second flanges by measuring any variation in the distance of the internal surface from the said flange axis around the inner circumference of the bore at a first point within said first flange, a second point within said second flange, and at least a third point which is longitudinally spaced between said first and second flanges; (d) performing a first straightening operation on the billet in order to reverse any curvature along the longitudinal axis outside of allowed tolerance for the component identified in the billet by measurement of variations in the distance of the inner surface of the bore from the flange axis around the inner circumference of the bore at any of the measurement points during the first probing step which are outside of allowance tolerance for the component; (e) performing a further machining operation on the outside surface of the billet to reduce the wall thickness of the bore; (f) measuring the wall thickness of the bore around the circumference of the billet at least at two different axial positions along the billet in order to confirm uniform wall thickness around and along the billet within allowable tolerance for the component; (g) checking the billet to identify any remaining curvature about the longitudinal axis of the bore; (h) performing a further straightening operation on the billet to correct any curvature outside of allowable tolerance detected in step (g); (i) performing a final machining operation in order to form any ports and upstands which are required in the component and to remove any other unwanted material from the exterior of the billet; and (j) performing a fine honing operation on the longitudinal bore in order to reduce the wall thickness and the diameter of the bore to the final specified values.

A method in accordance with the invention has the advantage that it recognises that the centreline of the bore may well not align with the centreline of the bore and accordingly works to identify and correct any deformation which occurs during machining operations by probing relative to the original centreline of the bore defined between the centres of the two datums, and, after each stage which involves removing material from the surface of the billet, manipulating the billet to restore concentricity of the bore around the original straight centreline defined between the centres of the two datums. In this way, concentricity is maintained and uniform, wall thickness achieved in the final component.

Preferably, the longitudinal bore is a blind bore, and the rough machining operation preferably comprises a turning operation such that the billet has a circular cross-section. In particular, the rough machining operation includes forming a flange on the outside surface of the bar at each axial position at which an upstand is required on the final work piece, each flange being sized to allow it to be machined in the third machining operation to form the required upstand associated with its position on the billet.

The probing step preferably comprises inserting a probe into the bore along the flange axis of the billet, and, at each axial position in which a measurement is to be taken, measuring the distance from the probe to the interior surface of the bore at different points around the bore. The probe may comprise a strain gauge which engages with the interior surface of the bore, changes in strain in the strain gauge being indicative of changes in the distance of the circumference of the bore from the flange axis. Other probes may also be used, such as optical, acoustic etc.

In a particularly preferred embodiment, the probing operation comprises mounting the billet on a bed which has first and second supports whose support surfaces complement the external surface of the first and second flanges respectively, the billet being supported on the bed by the first and second flanges being engaged respectively with the first and second supports such that the flange axis is parallel to the bed and aligned with the longitudinal axis of the probe which is mounted on the bed. This has the advantage that the billet is accurately positioned relative to the probe to make probing easier.

The billet is advantageously rotatable on said supports so as to allow the interior surface of the bore to be rotated around the probe whilst maintaining the flange axis aligned with the longitudinal axis of the probe. This makes probing around the inner circumference much easier.

The straightening operation preferably comprises deforming the billet in a press, and may also optionally include machining the outside surface of at least one of the first and second flanges in order to correct any eccentricity detected at the at least one of the first and second flanges after the straightening operation has corrected any eccentricity at the at least third point on the billet.

Depending on the amount of material which needs to be removed from the billet, the final wall thickness required and the material used, it may be preferably to reduce the wall thickness in a number of machining steps with smaller amounts of material preferably being removed during each operation. IN one embodiment, then said further machining operation is followed by a second probing operation on the interior surface of the bore in order to check the concentricity of the interior surface about the flange axis; said second probing operation being carried out at said first point, said second point and at said at least third point. Said second probing operation is followed by a second straightening operation to correct any curvature in the billet outside of allowable tolerance measured during said second probing operation.

A still further machining operation may then be carried out after the second probing operation and before step (f) in order to further reduce the outside diameter of the billet, away from the flanges, to the outside diameter specified for the component.

Measuring the wall thickness of the bore preferably comprises measuring the wall thickness from the outside of the billet at said at least two axial position, measurements at each axial position being take at least at three different points around the out circumference of the billet. The wall thickness is preferably measured at least at three different axial positions spaces along the billet.

Said final machining operation preferably comprises at least one of a milling operation to remove excess material from said flanges in order to form upstands which are required on the component as well as to form any profile required on the blind end of the component, and a drilling operation to form any bores which are required to interconnect with the axial bore in the billet.

BRIEF DESCRIPTION OF THE DRAWINGS

In order that the invention may be well understood, there will now be described some embodiments thereof, given by way of example, reference being made to the accompanying drawings, in which:

FIG. 4 is a side view of the billet of FIG. 2 undergoing a probing step which forms part of the method of the invention;

FIG. 5 is a sectional view of the billet of FIG. 2 after a second stage of the manufacturing method of the invention.

DETAILED DESCRIPTION OF THE PREFERRED EMBODIMENTS

Figure 1:
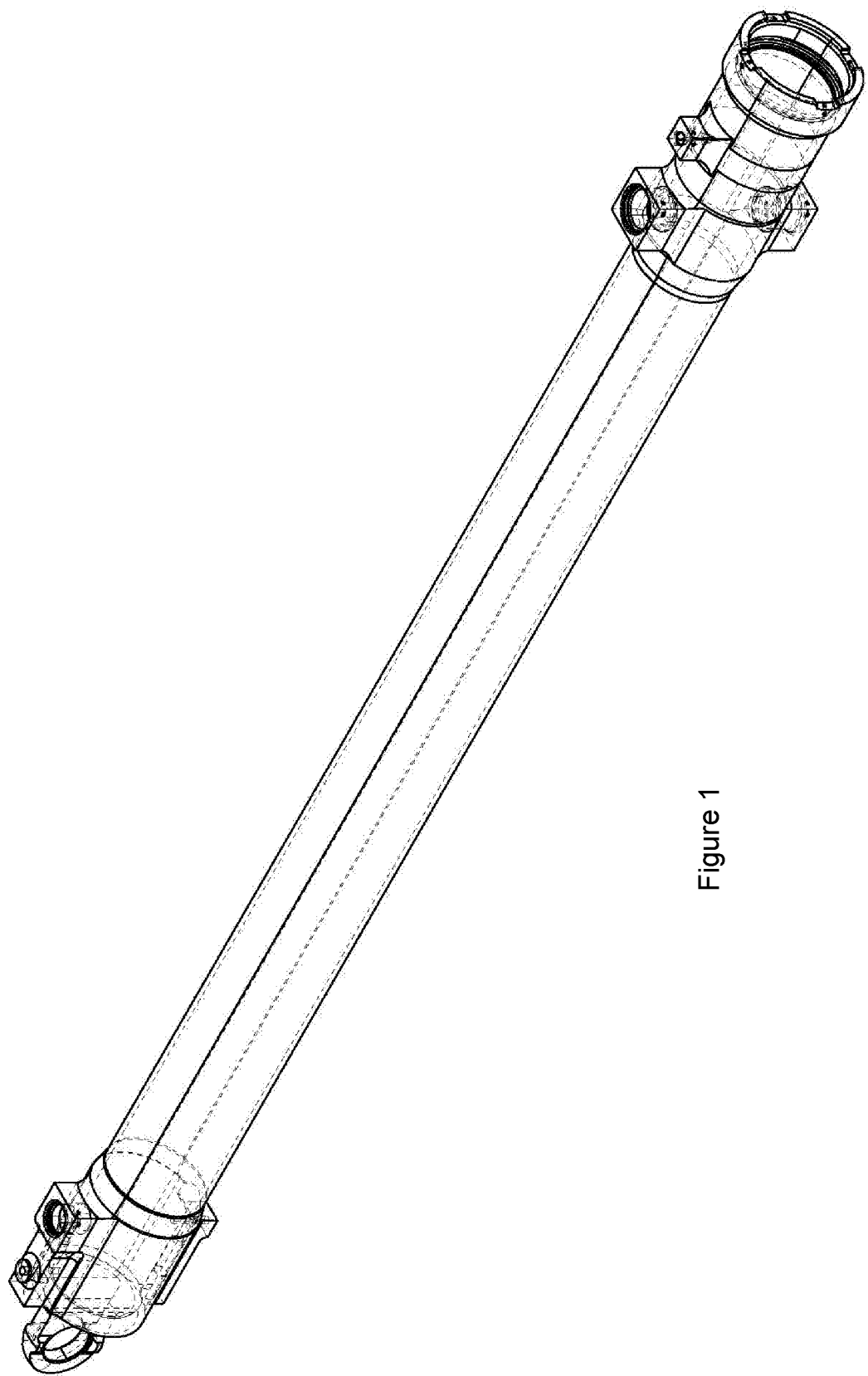
FIG. 1 is an example of a component which is suitable for manufacture by the method of the present invention.
Figure 2:
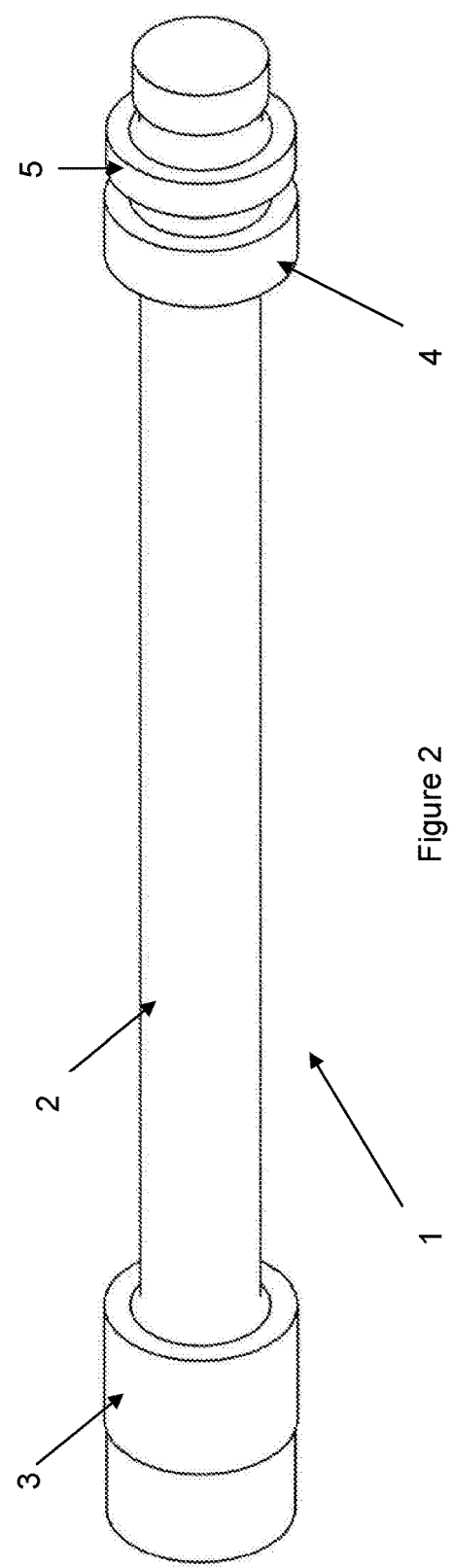
FIG. 2 is a perspective view of a billet after a first stage of the manufacturing component of FIG. 1 according to the method of the invention.

Referring first to FIG. 2, there is shown a perspective view of cylindrical component which has been machined from a solid bar 1 of material during a first stage of a manufacturing a component of the type shown in FIG. 1 according to the method according to the invention. The main body 2 of the bar or billet 1 machined down to a suitable clearance size above the final required outside diameter for the main body 2 using a conventional machine process such as by working on a lathe. The required clearance size will depend on the final shape of the particular work piece, the minimum wall thickness which must be left on the bar after a boring operation is carried out as described below and the properties of the material being used for the work piece. A clearance size of 6 mm greater than the finished outside diameter of the work piece has been found to work for many applications. Flanges 3, 4, 5, each having a radius which is larger than the clearance radius of the main body 2, are left on the bar 1 during this first machine stage corresponding to the positions of any upstanding such as ports etc which are required in the final work piece. Typically the upstands will typically extend radially from the bar 1 and extend only partially around the bar 1. At this stage, however, the flange associated with each required upstand extends around the entire periphery of the bar 1 and has an outer radius which is greater than the required final outer radius of the associated fin. Although in the illustrated embodiment, three flanges are present, it will be understood that the number and position of the flanges will vary depending the design of the component being manufactured.

In addition to ensuring material is maintained to form the desired fins on the end workpiece, at least two of the flanges 3, 5 are also used as datum points for measuring and correcting any distortions which occur in the bar 1 during the manufacturing process as described below. In particular, the datums 3, 5 are selected to be spaced apart from each other, preferably being associated with opposing ends of the bar 1. Each datum is machined so as have an outer circumferential surface which is accurately centred on the centre-line of the bar 1 to within the allowed manufacturing tolerance for the wall thickness of the main body 2 of the bar 1.

Figure 3:
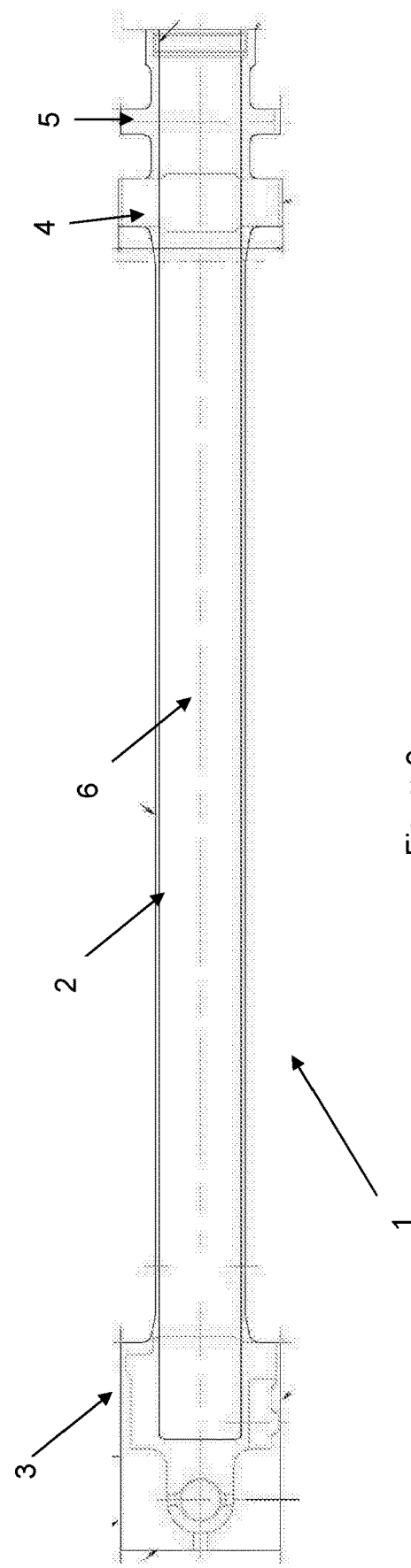
FIG. 3 is a sectional view of the billet of FIG. 1.

Once the bar is formed with the necessary flanges and datums 3, 5, as shown in FIGS. 2 and 3, a central bore 6 is formed in a boring operation, and the bore is then rough honed so that the diameter of the bore is slightly smaller than the specified outside diameter of the main body 2 for the component. During this boring and honing operation, the bar is supported at the datums 3, 5 such that central bore 6 is accurately centred with the centre line of the bar 1 at least at the two datums 3, 5.

As material is removed from the bar 1 during the various manufacturing stages, depending on the particular material from which the bar 1 is formed, the bar 1 can deform due to material "memory" resulting from internal stresses which are relieved as material is removed. As a result, although the central bore 6, for example, should accurately pass through the centre line of the two datums 3, 5, at other points along the bar, it can deviate from the centre line of the bar 1 resulting in eccentricities in the work piece.

Once the central bore 6 has been formed and rough honed as described above, the bar 1 is then mounted on a probing bed 7, shown in FIG. 4, which includes a pair of supports 8, 9, one associated with each of the datums 3, 5. Each support 8, 9 is accurately machined with a seating surface 8a, 9a which is sized and shaped to support its associated datum 3, 5 such that when the datums are engaged on the seating surfaces 8a, 9a, the centre lines of the seating surfaces 8a, 9a and of the datums 3, 5 all coincide with each other and with the longitudinal centre line of a probe 10 which is longitudinally moveable along the probe bed. In the embodiment illustrated in FIG. 4, the seating surfaces 8a, 9a are V-shaped, but it will be understood that other shapes are possible. For example, each support surface could have an arcuate shape which complements the curvature of the outer surface of its associated datum.

Once mounted on the probing bed, the probe 10 is inserted into the bore 6 along the centre line of the bore 6 defined by the common centre line of the two datums 3, 5 and is used to measure the distance of the inner surface of the central bore 6 from the common centre line of the datums at least at one point along the bar between the datums, and more particularly to measure variations in said distance in order to measure any eccentricity which will have resulted from deformations in the bar. Effectively, the probe is used to measure the position of the inner surface of the bore at a particular point along the bar 1 from the centres of the datums 3, 5 which lie on the centre line of the bore 6 around the entire inner circumference of the bore at the particular point. The probe may take a number of different forms, such as a strain gauge mounted on a probe bar which is inserted along the common centre line and adjusted so that the tip of the strain gauge contacts the inner surface of the central bore. AS the work piece is rotated about the common centre line by turning it on the seating surfaces 8a, 9a, any eccentricity in the central bore 6 at the probing point will result in changes in the contact pressure on the strain gauge and, hence, changes in the measured strain can be used to measure the deformation in the bar 1 at the probing point. Other apparatus may also be used within the scope of the invention to measure the variation in the distance of the inner surface from the common centre line, such as a laser. It will also be understood that more than two datums may be used if it is deemed necessary.

In the preferred embodiment, the measurement is taken at the centre point of the bar 1, but other points could be used, particularly if a flange is formed on the bar 1 at or close to the centre. If required, measurements can also be taken at multiple points along the bar between the datums, but it has been found that a single measurement taken approximately centrally between the datums is usually sufficient.

If any eccentricity outside of allowable tolerance for the particular work piece is detected from the probing of the central bore 6, a press is used to corrected the deformation cause the eccentricity by applying pressure to the convex outer surface of the deformation (that is to the outside of the bar on the side on which the greatest movement away from the common centre line was detected during the probing) in order to deform the back to bring the inner surface of the central bore back into concentricity about the common centre line within the allowable tolerance for the workpiece.

The eccentricity is also measured at each of the datums to confirm their concentricity. IN the event that eccentricity outside of allowable tolerance is detected at either of the datums 3, 5 after correction of eccentricity in the middle of the bar 1, since the bore itself is assumed to have been straight at the time of machining, the eccentricity at the datums 3, 5 must be the result of the outer surface of the eccentric datum not be centred on the centre of the bore so that as the work piece is rotated during the probing operation to take measurements at different quadrants of the bar, the longitudinal axis is actually moving up and down at the offending datum. Accordingly, the or each eccentric datum is then corrected by performing a machining operation thereby, such as turning in a lathe, in order to remove material from the outer surface thereof and thereby restore concentricity of the outer surface of each datum about the common centre line.

IT is important to note that in the probing operation set out above, which may be repeated at other stages during the manufacturing process as set out below, the checks and adjustments which are carried out are primarily to check and restore the concentricity of the central bore 6 of the bar 1 and not the outer surface. Furthermore, the concentricity is checked about the centre line of the bore where it passes through the two datums, and not the centre line of the bar. This is critical to the implementation of the invention since, during the boring process the bore which is produced is generally accepted to be straight, although it is possible that the longitudinal axis of the central bore may not be aligned with or even parallel to the longitudinal axis of the bar 1. By checking and restoring the concentricity of the central bore 6, and then using the longitudinal axis of the central bore 6 as the working axis for subsequent machining operations as set out below, it is ensured that, as close as possible, uniform wall thickness for the tubular member is maintained achieved during the subsequent machining operations as set out below.

Once the bar has been probed and concentricity restored as described above, the main body 2 is then subjected to a necking operation in order to further reduce the outside diameter of the main body 2, and hence the wall thickness of the main body 2, as shown in FIG. 5. In the described embodiment, material is removed to further reduce the wall thickness such that the outer surface is within 2 mm of its final specified size. This is done by a conventional turning operating in a lathe with the machining being done about the common centre line of the datums 3, 5 which, following the probing, will coincide, within allowable tolerance, with the centre line of the bore 6.

During this necking operation, the removal of material will result in the further release of stress within the material, which will result in further deformation of the bar, although the smaller amount of material which is being removed will mean that the deformation should be smaller than occurs during the initial turning and boring operation.

Following the necking operation, the workpiece is again probed as described above in order to check and correct any eccentricity which developed during the turning down of the main body 2. In additional to probing in the middle of the bar, the bore 6 is again also probed at the datums 3, 5 after the concentricity of the centre has been corrected by pressing in order to confirm concentricity is maintained at the datums, although it is unlikely that further machining of the datums would be necessary at this stage. If, however, either of the datums are found to be outside allowance tolerance for eccentricity, the datum may be further machined as described above in connection with the first probing step in order to restore concentricity of the or each eccentric datum 3, 5.

After the necking and second probing steps, a final turning step is carried out to remove the remaining 2 mm of excess material from the outer surface and thereby reduce the outer surface of the main body to its final outer diameter. Because only a very small amount of material is left to be removed during this final turning step, any further deformation which occurs to the main body during this step will produce negligible impact on the concentricity of the bore 6. Accordingly, following the final turning step it is not necessary to probe the bore again. Instead, the wall thickness of the main body is measured, preferably at 3 points along the main body 2, in order to ensure that the wall thickness is equally within allowable tolerance. If the measurements taken confirm equal wall thickness at the 3 points, it can be concluded that the walls must be concentric, because if they were not then the wall thickness would vary.

The measurement of the wall thickness may be done in any well known manner such as using an acoustic measuring device, callipers, or the like.

Even though the wall thickness has been confirmed as being equal along the main body 2, it is possible that the final turning step has resulted in some further deformation of the bar in the form of curving. The bar 1 is therefore checked again after checking the wall thickness for straightness and straightened as necessary in a press. The straightness can be checked at this stage by a simple check of the outside surface or the like. Probing as described above is not necessary for this check as the consistency of the wall thickness has been confirmed and hence the concentricity or otherwise of the outside can used as an indicator of the straightness or otherwise of the bar.

Figure 6:
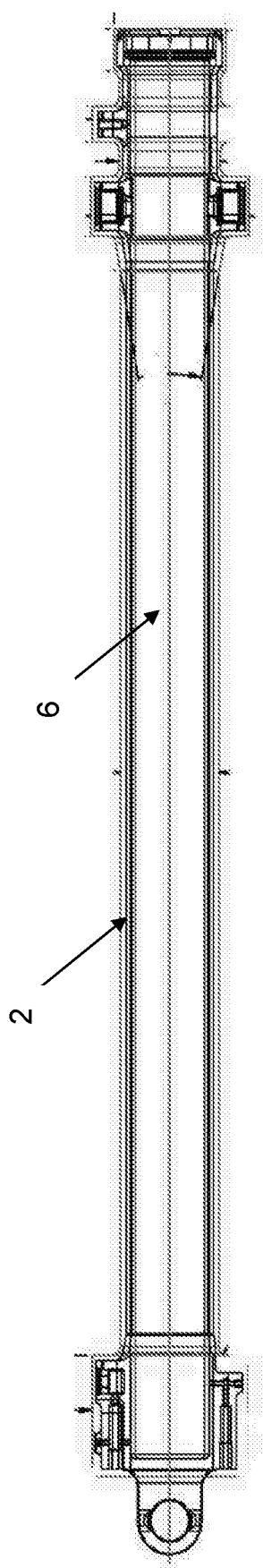
FIG. 6 is a sectional view of the billet of FIG. 1 after a third stage of the manufacturing method of the invention.

Required milling and drilling operations are then carried out to remove excess material from the flanges 3, 4, 5, including the datums, to form the required upstands, ports and other external protrusions on the outer surface or end of the bar 1 which cannot be formed by turning operations, which will include drilling through the annular wall of the work piece 1 in order to form the hydraulic fluid ports which extend from the central bore 6. The closed end of the bar 1 is also machined to formed it into the required shape, as shown in FIG. 6.

The final stage of the process is to perform a fine honing operation on the central bore 6 to take it to its final specified internal diameter, which will also remove any burrs or the like which may be left on the inner surface of the central bore 6 by the drilling of the hydraulic fluid ports.

It will be understood that the embodiment example described above is exemplary only and that variations are possible within the scope of the invention depending on the specification and design of a particular work piece and the material used. For example, for some materials, it may be possible reduce the outside diameter of the main body 2 down to its final specified diameter in just two turning operations, one carried out before the forming of the central bore 2 and one after, with just a single probing step being carried out between them, and the wall thickness measuring being carried out after the second truing operation as described above.

Furthermore, in the event that only one port or upstand is required on the component, two flanges will still be formed to form two datums, one being located to coincide with the single required upstand and the other located appropriately for supporting the bar 1 during the probing, the other flange then being complete removed during the final milling operation.

What is claimed is:

1. A method of manufacturing a tubular component comprising the steps of:
    (a) rough machining an exterior surface of a solid billet of material to reduce the size thereof and form at least a first radially extending flange and a second radially extending flange on the exterior of the billet, said flanges being centered on and axially spaced along a longitudinal axis of the billet;
    (b) machining a bore which extending axially in the billet;
    (c) performing a first probing operation on the interior surface of the bore in order to check a concentricity of the interior surface about a flange axis which extends longitudinally between the centers of the first and second flange by measuring any variation in the distance of the internal surface from the said flange axis around the inner circumference of the bore at a first point within said first flange, a second point within said second flange, and at least a third point which is longitudinally spaced between said first and second flanges;
    (d) performing a first straightening operation on the billet in order to reverse any curvature along the longitudinal axis outside of allowed tolerance for the component identified in the billet by measurement of variations in the distance of the inner surface of the bore from the flange axis around the inner circumference of the bore at any of a measurement points during the first probing step which are outside of allowance tolerance for the component;
    (e) performing a further machining operation on the exterior surface of the billet to reduce a wall thickness of the bore;
    (f) measuring the wall thickness of the bore around the circumference of the billet at least at two different axial positions along the billet in order to confirm uniform wall thickness around and along the billet within allowable tolerance for the component;
    (g) checking the billet to identify any remaining curvature about the longitudinal axis of the bore;
    (h) performing a further straightening operation on the billet to correct any curvature outside of allowable tolerance detected in step (g);
    (i) performing a final machining operation in order to form any ports and upstands which are required in the component and to remove any other unwanted material from the exterior of the billet; and
    (j) performing a fine honing operation on a longitudinal bore in order to reduce the wall thickness and a diameter of the bore to the final specified values.

2. The method according to claim 1, wherein the longitudinal bore is a blind bore.

3. The method according to claim 1, wherein the rough machining operation comprises a turning operation.

4. The method according to claim 1, wherein the rough machining operation includes forming a flange on the exterior surface of the billet at each axial position at which an upstand is required on a final work piece, each flange being sized to allow it to be machined in the third machining operation to form the required upstand associated with its position on the billet.

5. The method according to claim 1, wherein the first and second flanges are associated with opposing ends of the billet.

6. The method according to claim 1, wherein forming of the flanges and reduction in the size of the exterior surface of the billet in the rough machining operation is carried out in a single machining operation.

7. The method according to claim 1, wherein the longitudinal bore is formed by a boring operation.

8. The method according to claim 1, wherein the probing step comprising inserting a probe into the bore along the flange axis of the billet, and, at each axial position in which a measurement is to be taken, measuring the distance from the probe to the interior surface of the bore at different points around the bore.

9. The method according to claim 8, wherein the probe comprises a strain gauge which engages with the interior surface of the bore, changes in strain in the strain gauge being indicative of changes in the distance of the circumference of the bore from the flange axis.

10. The method according to claim 8, wherein the probing operation comprises mounting the billet on a bed which has first and second supports whose support surface complement the exterior surface of the first and second flanges respectively, the billet being supported on the bed by the first and second flanges being engaged respectively with the first and second supports such that the flange axis is parallel to the bed and aligned with the longitudinal axis of the probe which is mounted on the bed.

11. The method according to claim 10, wherein the billet is rotatable on said supports so as to allow the interior surface of the bore to be rotated around the probe whilst maintaining a flange axis aligned with the longitudinal axis of the probe.

12. The method according to claim 11, wherein the probing step comprises inserting the probe into the bore until is it as a first position along the billet at which a measurement is required, rotating the billet on the bed whilst monitoring the reading from the probe to record changes in the distance of the surface of the bore from the probe, and repeating for each additional measurement point required.

13. The method according to claim 1, wherein the straightening operation comprises deforming the billet in a press, and further includes machining the exterior surface of at least one of the first and second flanges in order to correct any eccentricity detected at the at least one of the first and second flanges after the straightening operation has corrected any eccentricity at the at least third point on the billet.

14. The method according to claim 1, wherein said further machining operation comprises a turning operation which reduces an outside diameter of the billet, excluding the flanges.

15. The method according to claim 14, wherein said further machining operation is followed by a second probing operation on the interior surface of the bore in order to check the concentricity of the interior surface about the flange axis; said second probing operation being carried out at said first point, said second point and at said at least third point.

16. The method according to claim 15, wherein said second probing operation is followed by a second straightening operation to correct any curvature in the billet outside of allowable tolerance measured during said second probing operation.

17. The method according to claim 15, wherein a still further machining operation is carried out after second probing operation and before step (f) in order to further reduce the outside diameter of the billet, away from the flanges, to the outside diameter specified for the component.

18. The method according to claim 17, wherein the amount of material removed from the billet during said still further machining operation is smaller than in any one of said preceding machining operations.

19. The method according to claim 1, wherein measuring the wall thickness of the bore comprises measuring the wall thickness from the outside of the billet at said at least two axial position, measurements at each axial position being take at least at three different points around the outer circumference of the billet.

20. The method according to claim 1, wherein said final machining operation comprises at least one of a milling operation to remove excess material from said flanges in order to form upstands which are required on the component, and a drilling operation to form any bores which are required to interconnect with the axial bore in the billet.

* * * * *